United States Patent
Malon et al.

(10) Patent No.: US 11,194,974 B2
(45) Date of Patent: Dec. 7, 2021

(54) TEACHING SYNTAX BY ADVERSARIAL DISTRACTION

(71) Applicant: NEC Laboratories America, Inc., Princeton, NJ (US)

(72) Inventors: Christopher Malon, Fort Lee, NJ (US); Asim Kadav, Jersey City, NJ (US); Juho Kim, Savoy, IL (US)

(73) Assignee: NEC Corporation

( * ) Notice: Subject to any disclaimer, the term of this patent is extended or adjusted under 35 U.S.C. 154(b) by 221 days.

(21) Appl. No.: 16/522,742

(22) Filed: Jul. 26, 2019

(65) Prior Publication Data

US 2020/0050673 A1    Feb. 13, 2020

Related U.S. Application Data

(60) Provisional application No. 62/716,721, filed on Aug. 9, 2018.

(51) Int. Cl.
| | |
|---|---|
| *G10L 15/00* | (2013.01) |
| *G10L 15/28* | (2013.01) |
| *G06F 17/00* | (2019.01) |
| *G06F 40/40* | (2020.01) |
| *G06N 3/08* | (2006.01) |

(52) U.S. Cl.
CPC .............. *G06F 40/40* (2020.01); *G06N 3/08* (2013.01)

(58) Field of Classification Search
CPC ............ G06F 40/30; G06F 40/40; G06N 3/08
USPC ..................................... 704/9, 202, 257, 259
See application file for complete search history.

(56) References Cited

U.S. PATENT DOCUMENTS

| | | | | |
|---|---|---|---|---|
| 10,437,833 | B1* | 10/2019 | Nguyen | G06F 40/30 |
| 10,699,060 | B2* | 6/2020 | McCann | G06F 40/289 |
| 10,817,650 | B2* | 10/2020 | McCann | G06N 3/0445 |
| 10,839,284 | B2* | 11/2020 | Hashimoto | G06F 40/284 |
| 10,860,630 | B2* | 12/2020 | Blouw | G06F 16/9024 |
| 2012/0209590 | A1* | 8/2012 | Huerta | G06F 40/51 704/7 |
| 2014/0280292 | A1* | 9/2014 | Skinder | G06F 16/3338 707/767 |
| 2018/0121787 | A1* | 5/2018 | Hashimoto | G06F 40/253 |
| 2018/0121788 | A1* | 5/2018 | Hashimoto | G06N 3/084 |
| 2018/0121799 | A1* | 5/2018 | Hashimoto | G06F 40/284 |
| 2018/0349359 | A1* | 12/2018 | McCann | G06N 3/0454 |
| 2018/0373682 | A1* | 12/2018 | McCann | G06N 3/0445 |

(Continued)

OTHER PUBLICATIONS

Ba et al., "Layer Normalization", normalizaarXiv:1607.06450v1 [stat.ML] Jul. 21, 2016, pp. 1-14.

(Continued)

*Primary Examiner* — Khai N. Nguyen
(74) *Attorney, Agent, or Firm* — Joseph Kolodka

(57) ABSTRACT

A computer-implemented method and system are provided for teaching syntax for training a neural network based natural language inference model. The method includes selectively performing, by the hardware processor, person reversal on a set of hypothesis sentences, based on person reversal prevention criteria, to obtain a first training data set. The method further includes enhancing, by the hardware processor, a robustness of the neural network based natural language inference model to syntax changes by training the neural network based natural language inference model on original training data combined with the first data set.

18 Claims, 5 Drawing Sheets

(56) References Cited

U.S. PATENT DOCUMENTS

| | | | | |
|---|---|---|---|---|
| 2018/0373700 | A1* | 12/2018 | Farri | G16H 10/60 |
| 2019/0370389 | A1* | 12/2019 | Blouw | G06F 16/3329 |
| 2020/0050673 | A1* | 2/2020 | Malon | G06N 3/08 |
| 2020/0175396 | A1* | 6/2020 | Boyce | G06N 5/04 |

OTHER PUBLICATIONS

Bowman et al., "A large annotated corpus for learning natural language inference", Arxiv.org, Aug. 2015, 11 pages.
Natural Language Processing (Almost) from Scratch, Chen at al., "Enhanced LSTM for Natural Language Inference", Proceedings of the 55th Annual Meeting of the Association for Computational Linguistics, Aug. 2017, pp. 1657-1668.
Collobert et al., "Natural Language Processing (Almost) from Scratch", Journal of Machine Learning Research 12, Aug. 2011, pp. 2493-2537.
Conneau et al., "Supervised Learning of Universal Sentence Representations from Natural Language Inference Data", Proceedings of the 2017 Conference on Empirical Methods in Natural Language Processing, Sep. 2017, pp. 670-680.
Gardner et al., "AllenNLP: A Deep Semantic Natural Language Processing Platform", Proceedings of Workshop for NLP Open Souce Software, Jul. 2018, pp. 1-6.
Glockner et al., "Breaking NLI Systems with Sentences that Require Simple Lexical Inferences", Proceedings of the 56th Annual Meeting of the Association for Computational Linguistics (Short Papers), Jul. 2019, pp. 650-655.
Goodfellow et al., "Generative Adversarial Nets", : Advances in Neural Information Processing Systems 27 (NIPS 2014), Dec. 2014, pp. 1-9.
Gururangan et al., "Annotation Artifacts in Natural Language Inference Data", Proceedings of NAACL-HLT Jun. 2018, pp. 107-112.
Honnibal et al., "An Improved Non-monotonic Transition System for Dependency Parsing", Proceedings of the 2015 Conference on Empirical Methods in Natural Language Processing, Sep. 2015, pp. 1373-1378.
Jia et al., "Adversarial Examples for Evaluating Reading Comprehension Systems", Proceedings of the 2017 Conference on Empirical Methods in Natural Language Processing, Sep. 2017, pp. 2021-2031.
Kang et al., "AdvEntuRe: Adversarial Training for Textual Entailment with Knowledge-Guided Examples", Proceedings of the 56th Annual Meeting of the Association for Computational Linguistics (Long Papers), Jul. 2018, pp. 2418-2428.
Khot et al., "SCITAIL: A Textual Entailment Dataset from Science Question Answering", Association for the Advancement of Artificial Intelligence (www.aaai.org), Apr. 2018, pp. 3-9.
Naik et al., "Stress Test Evaluation for Natural Language Inference", Proceedings of the 27th International Conference on Computational Linguistics, Aug. 2018, pp. 2340-2353.
Nie at al., "Shortcut-Stacked Sentence Encoders for Multi-Domain Inference", Proceedings of the 2nd Workshop on Evaluating Vector-Space Representations for NLP, Sep. 2017, pp. 41-45.
Parikh et al., "A Decomposable Attention Model for Natural Language Inference", Proceedings of the 2016 Conference on Empirical Methods in Natural Language Processing, Nov. 2016, pp. 2249-2255.
Pennington et al., "GloVe: Global Vectors for Word Representation", Proceedings of the 2014 Conference on Empirical Methods in Natural Language Processing (EMNLP), Oct. 2014, 12 pages.
Peters et al., "Deep contextualized word representations", Proceedings of NAACL-HLT 2018, Jun. 2018, pp. 2227-2237.
Poliak et al., "Hypothesis Only Baselines in Natural Language Inference", Proceedings of the 7th Joint Conference on Lexical and Computational Semantics (*SEM), Jun. 2018, pp. 180-191.
Radford et al., "Improving Language Understanding by Generative Pre-Training", Semantic Scholar Aug. 2018, pp. 1-12.
Rajpurkar et al., "SQuAD: 100,000+ Questions for Machine Comprehension of Text", Proceedings of the 2016 Conference on Empirical Methods in Natural Language Processing, Nov. 2016, pp. 2383-2392.
Ribeiro et al., "Semantically Equivalent Adversarial Rules for Debugging NLP Models", Proceedings of the 56th Annual Meeting of the Association for Computational Linguistics (Long Papers), Jul. 2018, pp. 856-865.
Sennrich et al., "Neural Machine Translation of Rare Words with Subword Units", Proceedings of the 54th Annual Meeting of the Association for Computational Linguistics, Aug. 2016, pp. 1715-1725.
Shen et al., "Baseline Needs More Love: On Simple Word-Embedding-Based Models and Associated Pooling Mechanisms", Proceedings of the 56th Annual Meeting of the Association for Computational Linguistics (Long Papers), Jul. 2018, pp. 440-450.
Thorne et al., "FEVER: a large-scale dataset for Fact Extraction and VERification", Proceedings of NAACL-HLT 2018, Jun. 2018, pp. 809-819.
Tsuchiya, Masatoshi, "Performance Impact Caused by Hidden Bias of Training Data for Recognizing Textual Entailment", arXiv.org > cs > arXiv: 1804.08117, Apr. 2018, pp. 1506-1511.
Vaswani et al., "Attention Is All You Need", 31st Conference on Neural Information Processing Systems (NIPS 2017), Dec. 2017, pp. 1-11.
Williams et al., "A Broad-Coverage Challenge Corpus for Sentence Understanding through Inference", Proceedings of NAACL-HLT 2018, Jun. 2018, pp. 1112-1122.
Young et al., "From image descriptions to visual denotations: New similarity metrics for semantic inference over event descriptions", Transactions of the Association for Computational Linguistics, 2 (2014), Feb. 2014, pp. 67-78.
Zhao et al., "Generating Natural Adversarial Examples", Published as a conference paper at ICLR 2018, May 2018, pp. 1-15.
Zhu et al., "Aligning Books and Movies: Towards Story-like Visual Explanations by Watching Movies and Reading Books", arXiv.org > cs > arXiv:1506.06724, Jun. 2015, pp. 19-27.

* cited by examiner

TEACHING SYNTAX BY ADVERSARIAL DISTRACTION

RELATED APPLICATION INFORMATION

This application claims priority to U.S. Provisional Patent Application Ser. No. 62/716,721, filed on Aug. 9, 2018, incorporated herein by reference herein its entirety.

BACKGROUND

Technical Field

The present invention relates to information processing and more particularly to teaching syntax by adversarial distraction.

Description of the Related Art

Natural language inference (NLI) is a task to identify the entailment relationship between a premise sentence and a hypothesis sentence. Given the premise, a hypothesis may be true (entailment), false (contradiction), or not clearly determined (neutral). NLI is an essential aspect of natural language understanding. The release of datasets with hundreds of thousands of example pairs has enabled the development of models based on deep neural networks that have achieved near human level performance.

Currently, natural language inference classifiers trained on existing datasets make errors because they do not understand how syntax affects meaning. Hence, there is a need for an approach for teaching natural language inference classifiers how syntax affects meaning in order to mitigate and/or otherwise eliminate corresponding errors caused by the same.

SUMMARY

According to an aspect of the present invention, a computer-implemented method is provided for teaching syntax for training a neural network based natural language inference model. The method includes selectively performing, by the hardware processor, person reversal on a set of hypothesis sentences, based on person reversal prevention criteria, to obtain a first training data set. The method further includes enhancing, by the hardware processor, a robustness of the neural network based natural language inference model to syntax changes by training the neural network based natural language inference model on original training data combined with the first data set.

According to another aspect of the present invention, a computer program product is provided for teaching syntax for training a neural network based natural language inference model. The computer program product includes a non-transitory computer readable storage medium having program instructions embodied therewith. The program instructions are executable by a computer to cause the computer to perform a method. The method includes selectively performing, by the hardware processor, person reversal on a set of hypothesis sentences, based on person reversal prevention criteria, to obtain a first training data set. The method further includes enhancing, by the hardware processor, a robustness of the neural network based natural language inference model to syntax changes by training the neural network based natural language inference model on original training data combined with the first data set.

According to yet another aspect of the present invention, a computer processing system is provided for teaching syntax for training a neural network based natural language inference model. The system includes a memory for storing program code. The system further includes a processor for running the program code to selectively perform person reversal on a set of hypothesis sentences, based on person reversal prevention criteria, to obtain a first training data set. The processor further runs the program code to enhance a robustness of the neural network based natural language inference model to syntax changes by training the neural network based natural language inference model on original training data combined with the first data set.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to teaching syntax by adversarial distraction.

In an embodiment, the present invention provides several datasets based on synthetic transformation of natural entailment examples to teach aspects of grammar and word order.

In an embodiment, a technique referred to as "adversarial distraction" is provided to teach networks to properly use syntax and semantic information. The adversarial distraction technique involves creating pairs of examples where information matching the premise is present in the hypothesis in both cases, but differing syntactic structure leads to different entailment labels. The created examples, called adversarial distractions, are automatically generated from a NLI dataset. Many existing NLI models misclassify the adversarial distractions. Retraining the models with the adversarial distractions added to the training data, can help them to use syntax information properly.

Figure 1:
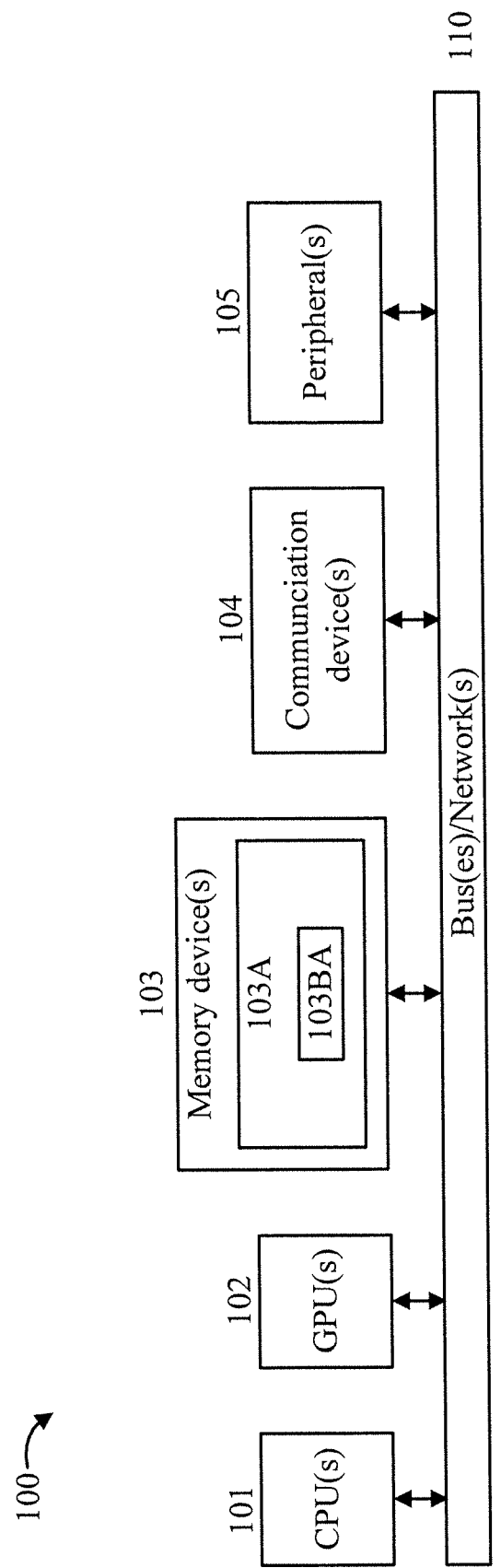
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processing system into a special purpose computer configured to implement various aspects of the present invention. In an embodiment, special purpose hardware (e.g., Application Specific Integrated Circuits, and so forth) can be used to implement various aspects of the present invention.

In an embodiment, the one or more memory devices 103 include an entailment module 103A. In another embodiment, the entailment module 103A can be implemented as special purpose hardware (e.g., an Application Specific Integrated Circuit, and so forth).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
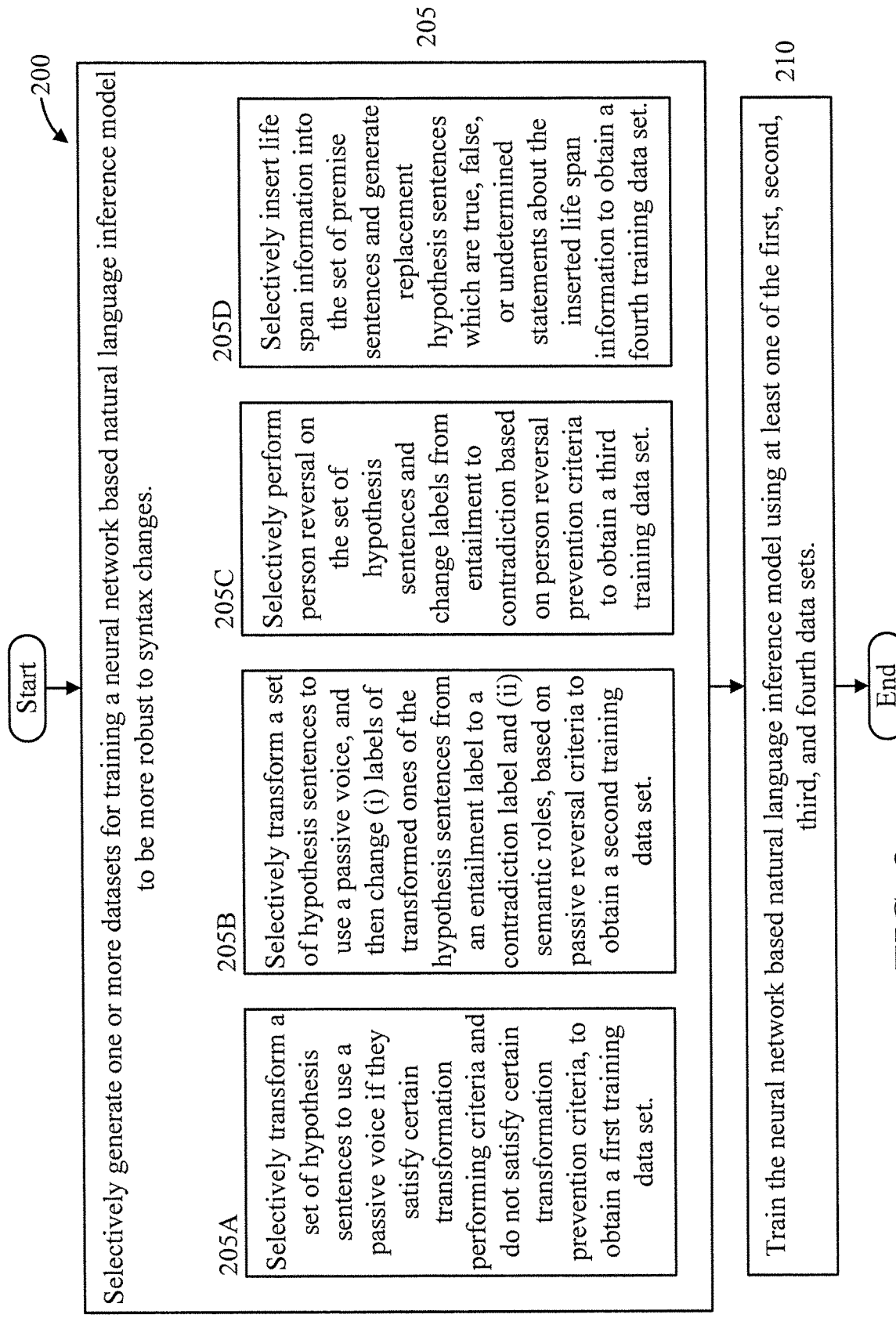
FIG. 2 is a flow diagram showing an exemplary method for teaching syntax by adversarial distraction, in accordance with an embodiment of the present invention.

FIG. 2 is a flow diagram showing an exemplary method 200 for teaching syntax by adversarial distraction, in accordance with an embodiment of the present invention.

At block 205, selectively generate one or more datasets for training a neural network based natural language inference model to be more robust to syntax changes.

In an embodiment, block 205 includes one or more of blocks 205A through 205D.

At block 205A, selectively transform a set of hypothesis sentences to use a passive voice if they satisfy certain transformation performing criteria and do not satisfy certain transformation prevention criteria, to obtain a first training data set. Block 205 preserves existing labels of the hypothesis sentences.

In an embodiment, the transformation performing criteria can include, but is not limited to, (i) the hypothesis sentence including a direct object that is a dependent of a root verb of the hypothesis sentence in the dependency parse tree, and (ii) the root verb of the hypothesis sentence being the head of the direct object.

In an embodiment, the transformation prevention criteria for a hypothesis sentence from the set can include, but is not limited to, (i) the hypothesis sentence including, as a direct object, a pronoun selected from the group consisting of a reciprocal pronoun and a reflexive pronoun, and (ii) the hypothesis sentence including verbs selected from the group consisting of phrasal verbs and prepositional verbs.

At block 205B, selectively transform a set of hypothesis sentences to use a passive voice, and then change (i) labels of transformed ones of the hypothesis sentences from an entailment label to a contradiction label and (ii) semantic roles, based on passive reversal criteria to obtain a second training data set.

In an embodiment, the passive reversal criteria can include, but is not limited to, for a hypothesis sentence in the set, satisfying the transformation performing criteria of block 205A, and not satisfying the transformation prevention criteria of block 205A, and the hypothesis sentence being initially labeled using the entailment label.

At block 205C, selectively perform person reversal on the set of hypothesis sentences and change labels from entailment to contradiction based on person reversal prevention criteria to obtain a third training data set.

In an embodiment, the person reversal prevention criteria can include, but are not limited to, the original label being the entailment label, and, for a given hypothesis sentence from the set, the sentence not containing a reciprocal verb.

At block 205D, selectively insert life span information into the set of premise sentences and generate replacement hypothesis sentences which are true, false, or undetermined statements about the inserted life span information to obtain a fourth training data set. In an embodiment, the life span information can include, but is not limited to, a birth date and a death date.

At block 210, train the neural network based natural language inference model using at least one of the first, second, third, and fourth data sets. In this way, syntax can be learned by the natural language inference model and the model can be trained to be more robust to syntax changes.

Figure 3:
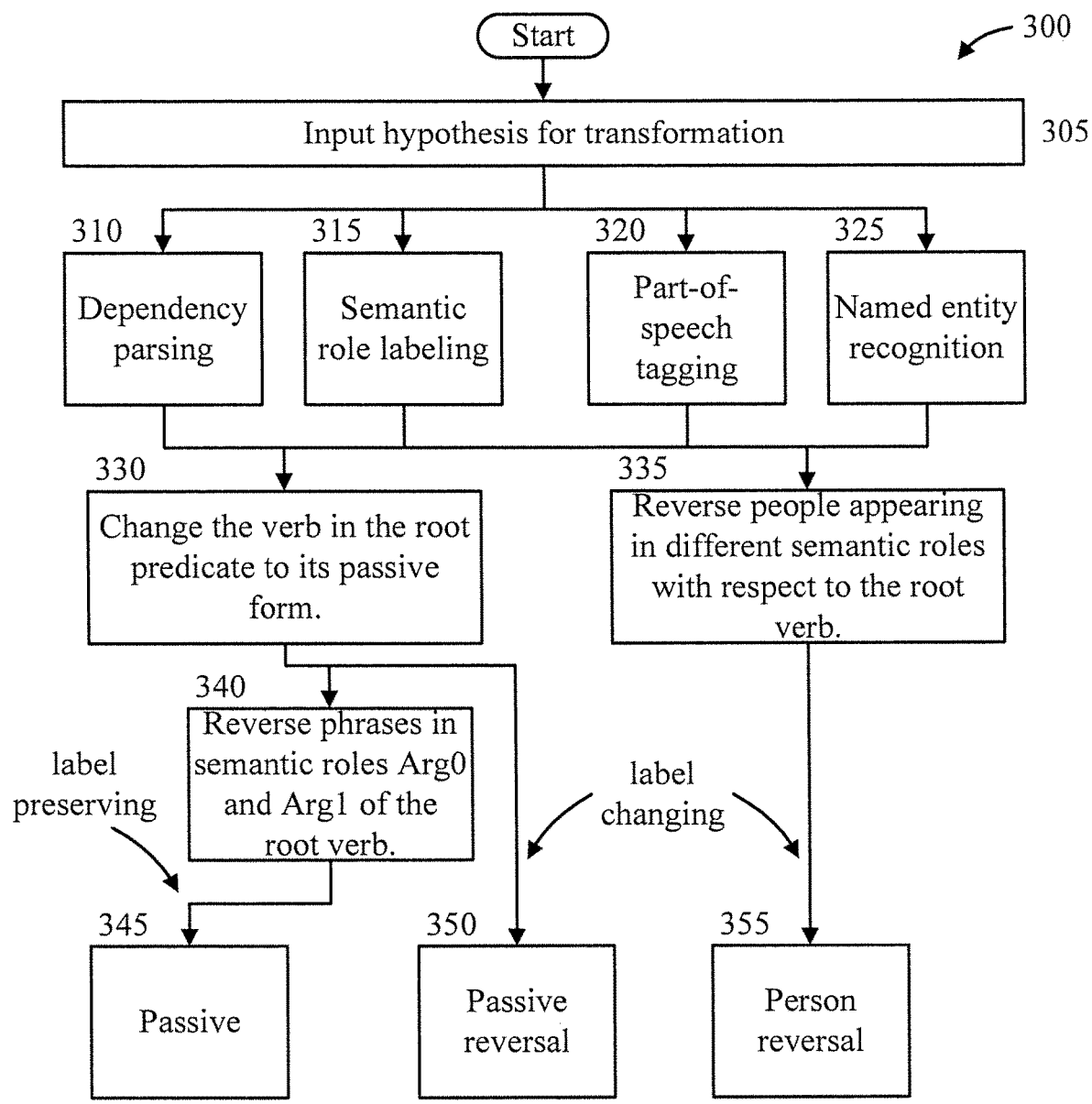
FIG. 3 is a flow diagram further showing the method of FIG. 2, in accordance with an embodiment of the present invention.

FIG. 3 is a flow diagram further showing the method of FIG. 2, in accordance with an embodiment of the present invention.

At block 305, input hypothesis sentences for transformation.

At block 310, perform dependency parsing on the hypothesis sentences.

At block 315, perform semantic role labeling on the hypothesis sentences.

At block 320, perform Part-Of-Speech (POS) tagging on the hypothesis sentences.

At block 325, perform named entity recognition on the hypothesis sentences.

At block 330, change the verb in the root predicate to its passive form.

At block 335, reverse people appearing in different semantic roles with respect to the root verb.

At block 340, reverse phrases in semantic roles Arg0 and Arg1 of the root verb.

At block 345, output the hypothesis sentences using a passive voice. It is to be appreciated that block 345 is a label-preserving action.

At block 350, output the hypothesis sentences using passive reversal, where the subject and the object in the hypothesis sentences are reversed after a passive voice transformation (per block 345). It is to be appreciated that this reversal undoes the effect of block 340, and is simply the result of block 330. It is to be appreciated that block 350 is a label-changing action.

At block 355, output the hypothesis sentences using person reversal, where named entities referring to people are reversed. It is to be appreciated that block 355 is a label-changing action.

A description will now be given regarding four data augmentation methods (I through IV) for natural language inference datasets, in accordance with one or more embodiments of the present invention. The first data augmentation method involves adding passive sentences. The second data augmentation method involves passive (sentence) reversal. The third data augmentation method involves person reversal. The fourth data augmentation method involves life span information.

The following description is made relative to various software and corpuses. However, it is to be appreciated that the present invention is not limited to solely these software and corpuses and, thus, other software and corpuses can also be used.

The four methods are now described as follows.

(I) A dataset for natural language inference is augmented by adding passive sentences.

(A) In a collection of hypothesis sentences of the Stanford Natural Language Inference (SNLI) dataset, candidate sentences that can be transformed to passive voice are chosen by using the dependency parsing results of spaCy®.

(1) spaCy® is a Python package for natural language processing that provides part-of-speech tagging, named entity recognition, dependency parsing, and so on. While one or more embodiments are described relative to spaCy®, other similar functioning software for natural language processing can also be used.

(2) Using the dependency parsing of spaCy®, each token is assigned to another token, called the head of that token. Conversely, each token assigned to a head is called a dependent of the head token. Each token receives a tag, describing the role of the token with respect to its head.

(3) For passive transformation, the sentence should include a direct object that is a dependent of the root verb of the sentence. The dependency parsing of spaCy® tags the root verb as "ROOT" and direct objects as "dobj". If the root verb is the head of some direct object, we consider the sentence to satisfy the passive transformation performing criteria.

(4) Even if a sentence satisfies the passive transformation performing criteria, there are several exceptions whose passive transform is unnatural. If direct object is reciprocal pronoun such as "each other" and "one another", or reflexive pronoun as such "themselves" and "yourself", the sentences cannot be transformed to passive voice and are eliminated from the candidate set. Also, sentences with phrasal verbs or prepositional verbs are removed although they have a direct object because it is hard to correctly recognize the beginning and end points of those verbs. These criteria are passive transformation prevention criteria.

(B) The next step is to apply Semantic Role Labeling (SRL) to the candidate sentences for passive transformation. The SRL results are obtained using SENNA.

(1) SENNA is an efficient natural language processing toolkit that provides semantic role labeling, part-of-speech tagging, chunking, named entity recognition and syntactic parsing. While one or more embodiments are described relative to SENNA, other similar functioning software for natural language processing can also be used.

(2) Semantic role labeling (SRL) identifies the semantic roles of arguments of each predicate in a sentence. Unlike the tags in dependency parsing, which are assigned to single words, semantic role arguments may span several consecutive words. The root verb of a sentence that includes a direct object usually has arguments with semantic roles tagged as Arg0 and Arg1. For a verb that is in active, not passive, form, Arg0 typically can be regarded as the subject, and Arg1 can be considered as the direct object in SRL.

(C) To make passive sentences, the position of Arg0 and Arg1 need to be switched in a sentence and the word "by" should be added before Arg0 after the switch. Then, the verb phrase including the root verb also has to be changed in a way that depends on the tense of the verb and whether the head noun of Arg1 is plural.

(1) The head noun of Arg1 is determined by the dependency parsing information of spaCy®. The "dobj" token that is a dependent of the "ROOT" token is the head noun of Arg1.

(2) Part-of-speech tagging offers the information about plurality of the head noun of Arg1 in a sentence. Singular nouns are tagged as "NN" or "NNP", and other noun tags such as "NNS" or "NNPS" represent plural nouns.

(3) The verb has to be transformed based on the plurality of head noun from step C2 and the tense of the verb. The tense is determined by the part-of-speech tagging of the original sentence.

(3.1) The first case is when there is "VB" tag (verb, base form) in the verb phrase of the root verb.

(3.1.1) Suppose the verb phrase also includes "VBG" (verb, gerund or present participle).

(3.1.1.1) Then the verb phrase is finally transformed as "being" and the past participle of the root verb.

(3.1.2) Suppose the verb phrase does not include "VBG" (verb, gerund or present participle).

(3.1.2.1) If the verb phrase also contains "VBN", the verb phrase is replaced by "been" and the past participle of the root verb.

(3.1.2.2) If not, the verb phrase is changed into "be" and the past participle of the root verb.

(3.2) When VB is not included in the root predicate, "VBD" (verb, past tense), "VBP" (verb, non-3rd person singular present), "VBZ" (verb, 3rd person singular present) are considered.

(II) A dataset for natural language inference is augmented through passive reversal.

(A) The process of making passive reversal sentences is the same as the passive transformation, except that the positions of Arg0 and Arg1 are not reversed.

(B) We consider passive reversal as a label-changing transformation from "Entailment" to "Contradiction". Thus, in addition to satisfying the passive transformation performing criteria and not satisfying the passive transformation prevention criteria, the original label of the sentences must be "Entailment."

(III) A dataset for natural language inference is augmented through person reversal.

(A) Named entity recognition for person is applied to a set of hypothesis sentences from the Fact Extraction and Verification (FEVER) dataset. Of course, other datasets may be used.

(1) SENNA is used for named entity recognition and semantic role labeling of each hypothesis sentence.

(B) According to the purpose of this augmentation changing the position of person named entities, we consider sentences that contain at least one person named entity in Arg0 and at least one person named entity in Arg1 of the root verb in semantic role labeling.

(1) To change a label from "Entailment" to "Contradiction", label-preserving person reversal is filtered out according to the following person reversal prevention criteria.

(1.1) If two person named entities are shown as noun compound phrases such as "Tom and Peter," reversing the names cannot change the semantics of the sentence. Thus, one of the named entities is required to occur in Arg0 and the other is required to occur in Arg1.

(1.2) If the candidate person named entities are connected through reciprocal verbs such as "date" and "meet" or the candidate person named entity is an object of the preposition "with", person reversal may not change the meaning of the sentence. This case is eliminated.

(C) The method reverses the positions of person named entities of filtered sentences.

(IV) A dataset for natural language inference is augmented through life span information.

(A) The augmentation based on the information about life spans considers the Fact Extraction and Verification (FEVER) dataset. Of course, other datasets can also be used.

(1) It detects person named entities in premise sentences of the dataset.

(B) The method inserts birth and death dates randomly in parentheses following a randomly chosen person named entity.

(1) The method assigns a new label according to an equally balanced label distribution among "Entailment", "Neutral", and "Contradiction."

(2) The method generates a new hypothesis regarding the chosen named entity, such as "Samuel Adams was born on Jan. 5, 1742." For the entailment examples, the method chooses "was born" or "died" randomly and uses the inserted date. For half of the contradiction examples, the method simply reverses the inserted birth and death dates. For the other half, it randomly selects another date. For the neutral examples, it uses a different named entity than the one that was annotated, taken from the same sentence if possible.

A further description will now be given regarding various aspects of the present invention.

The adversarial examples of the present invention attack NLI systems from a new direction: not in their failure to capture the relations between words, but their failure to consider the syntax and word order in premises and hypotheses to decide upon the entailment relation. As position-agnostic approaches provide competitive baselines to existing datasets, the power of models to interpret token position information has not been rigorously tested.

Figure 4:
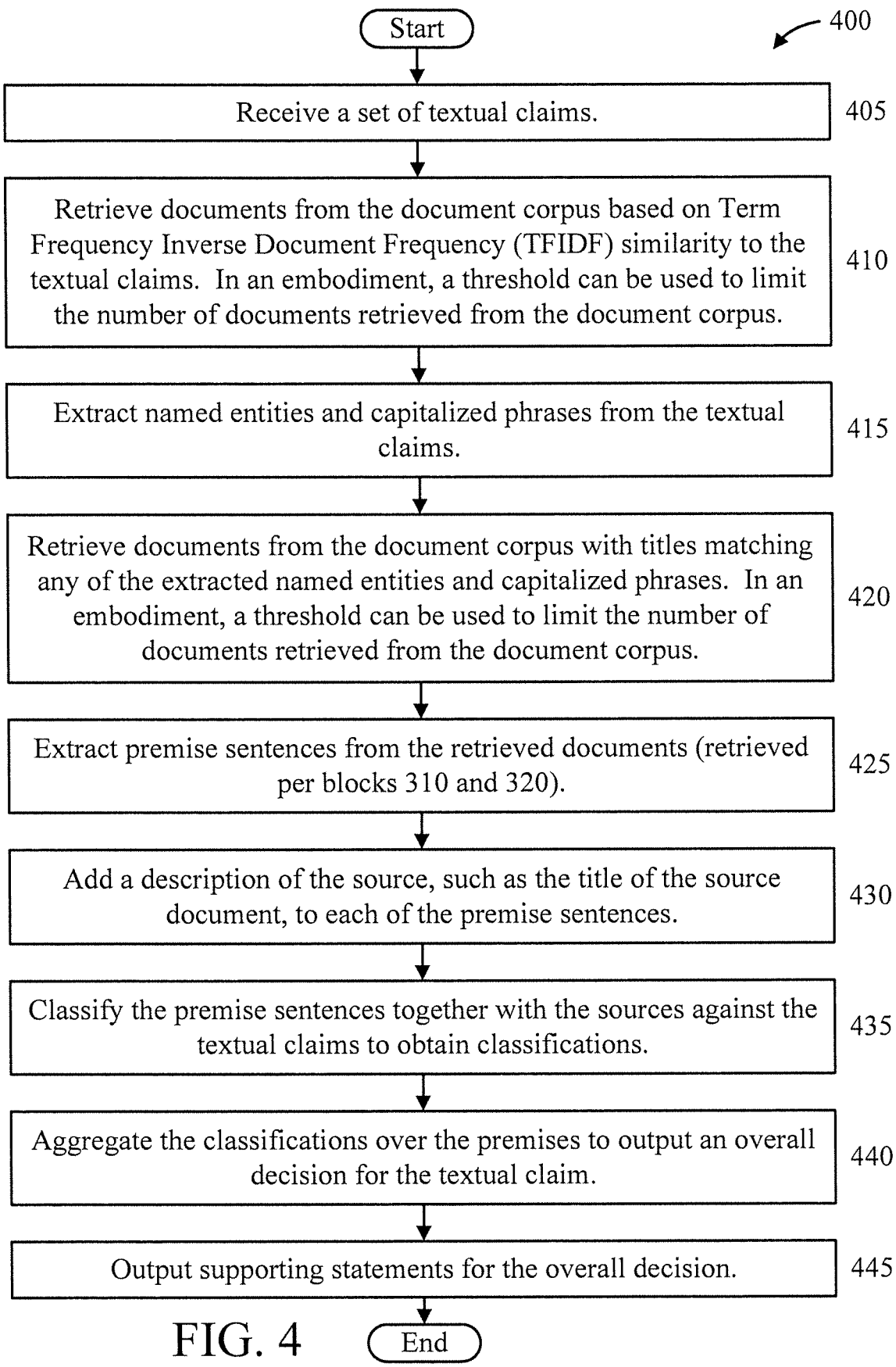
FIG. 4 is a diagram showing an exemplary method for verifying textual claims with a document corpus, in accordance with an embodiment of the present invention.

FIG. 4 is a diagram showing an exemplary method 400 for verifying textual claims with a document corpus, in accordance with an embodiment of the present invention. In an embodiment, block 435 of method 400 is performed using a natural language inference model trained in accordance with an embodiment of the present invention.

At block 405, receive a set of textual claims.

At block 410, retrieve documents from the document corpus based on Term Frequency Inverse Document Frequency (TFIDF) similarity to the textual claims. In an embodiment, a threshold can be used to limit the number of documents retrieved from the document corpus.

At block 415, extract named entities and capitalized phrases from the textual claims.

At block 420, retrieve documents from the document corpus with titles matching any of the extracted named entities and capitalized phrases. In an embodiment, a threshold can be used to limit the number of documents retrieved from the document corpus. In an embodiment, the same threshold is used as in block 410. In another embodiment, a different threshold can be used relative to that used in block 410.

At block 425, extract premise sentences from the retrieved documents (retrieved per blocks 410 and 420). A premise statement is a statement from the retrieved documents of the document corpus that can be used as evidence to possibly support or refute a textual claim.

At block 430, add a description of the source, such as the title of the source document, to each of the premise sentences.

At block 435, classify the premise sentences together with the sources against the textual claims to obtain classifications.

At block 440, aggregate the classifications over the premises to output an overall decision for the textual claim.

In an embodiment, block 440 can include block 440A.

At block 440A, output supporting statements for the overall decision.

Figure 5:
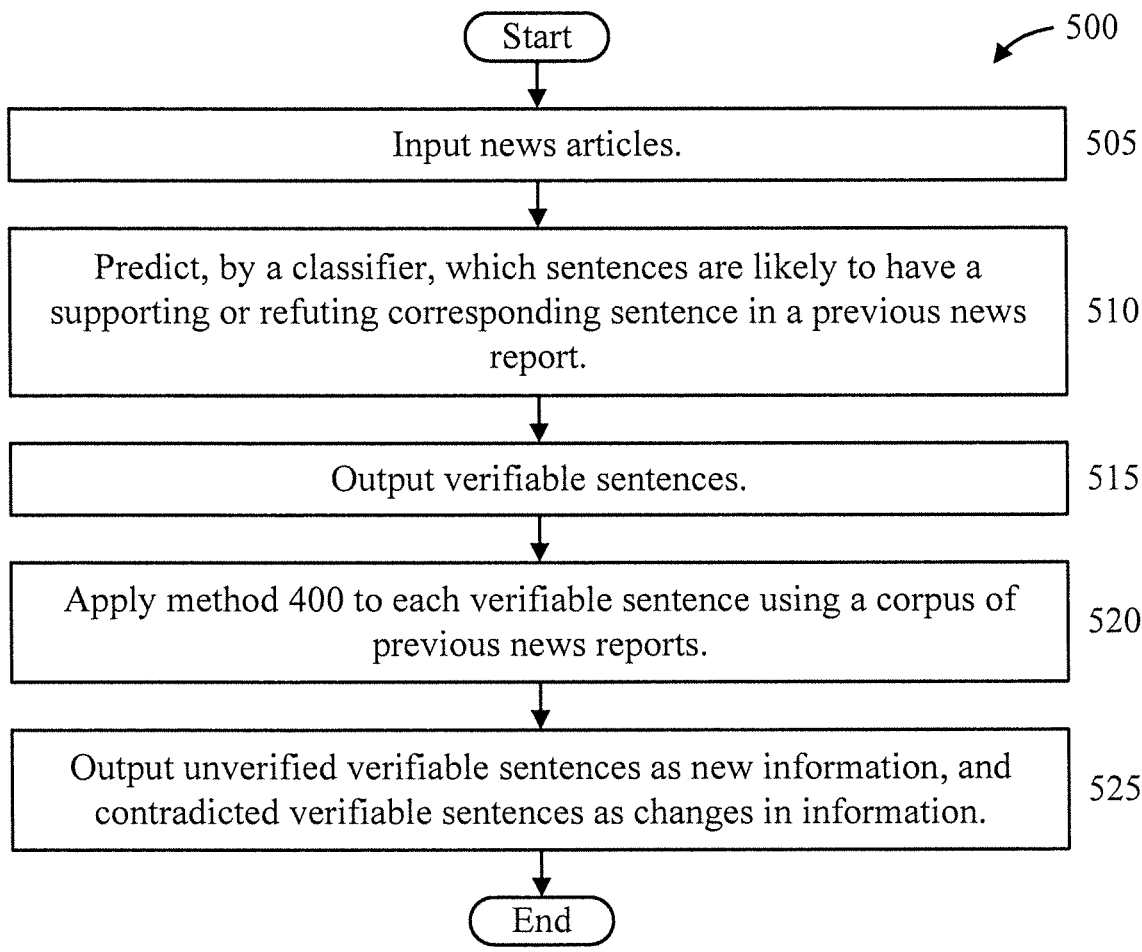
FIG. 5 is a flow diagram showing an exemplary method for summarizing new articles, in accordance with an embodiment of the present invention.

FIG. 5 is a flow diagram showing an exemplary method 500 for summarizing news articles, in accordance with an embodiment of the present invention. In an embodiment, block 510 of method 500 is performed using a natural language inference model trained in accordance with an embodiment of the present invention.

At block 505, input news articles.

At block 510, predict, by a classifier, which sentences are likely to have a supporting or refuting corresponding sentence in a previous news report.

At block 515, output verifiable sentences.

At block 520, apply method 400 to each verifiable sentence using a corpus of previous news reports.

At block 525, output unverified verifiable sentences as new information, and contradicted verifiable sentences as changes in information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for teaching syntax for training a neural network based natural language inference model, comprising:

selectively performing, by the hardware processor, person reversal on a set of hypothesis sentences comprised in original training data, based on person reversal prevention criteria, to obtain a first training data set; and enhancing, by the hardware processor, a robustness of the neural network based natural language inference model to syntax changes by training the neural network based natural language inference model on the original training data combined with the first training data set, wherein the person reversal reverses named entities referring to people, and wherein the person reversal prevention criteria comprises, for a given hypothesis sentence from the set, the hypothesis sentence including a reciprocal verb.

2. The computer-implemented method of claim 1, wherein the hypothesis sentences are labeled using labels selected from the group consisting of entailment, neutral, and contradiction.

3. The computer-implemented method of claim 2, wherein said selectively performing step changes existing labels of the hypothesis sentences.

4. The computer implemented method of claim 1, further comprising selectively transforming, by a hardware processor, a set of hypothesis sentences to use a passive voice, based on satisfying transformation performing criteria and dissatisfying transformation prevention criteria, to obtain a second training data set, and wherein said enhancing step comprises training the training the neural network based natural language inference model using the original training data combined with the first data set and the second data set.

5. The computer-implemented method of claim 4, wherein said selectively transforming step comprises, for a hypothesis sentence in the set, (i) identifying a subject and a direct object based on semantic role labeling, (ii) switching the subject and the direct object and then adding a term, "by", before the subject, and (iii) transforming a verb phrase to use a past participle.

6. The computer-implemented method of claim 4, wherein transformation performing criterion for a hypothesis sentence from the set is that a root verb of the hypothesis sentence is a head of a direct object in a dependency parse tree.

7. The computer-implemented method of claim 4, wherein the transformation prevention criteria for a hypothesis sentence from the set comprises (i) the hypothesis sentence including, as a direct object, a pronoun selected from the group consisting of a reciprocal pronoun and a reflective pronoun, and (ii) the hypothesis sentence including verbs selected from the group consisting of phrasal verbs and prepositional verbs.

8. The computer-implemented method of claim 1, further comprising using the hardware processor to (i) change a verb phrase to use a past participle, (ii) insert "by" before a phrase that was a direct object before the verb phrase was changed, and (iii) change labels of the hypothesis sentences from an entailment label to a contradiction label, based on passive reversal criteria, to obtain a second training data set, and wherein said enhancing step comprises training the training the neural network based natural language inference model using the original training data combined with the first data set and the second data set.

9. The computer-implemented method of claim 8, wherein the passive reversal criteria comprises, (i) for a hypothesis sentence in the set, the hypothesis sentence being initially labeled using the entailment label, (ii) a root verb of the hypothesis sentence is a head of a direct object in a dependency parse tree, (iii) the hypothesis sentence not including, as a direct object, a pronoun selected from the group consisting of a reciprocal pronoun and a reflective pronoun, and (iv) the hypothesis sentence not including verbs selected from the group consisting of phrasal verbs and prepositional verbs.

10. The computer-implemented method of claim 1, further comprising selectively inserting, by the hardware processor, life span information into the set of premise sentences and generating new hypothesis sentences and labels based on the inserted life span information to obtain a second training data set, and wherein said enhancing step comprises training the training the neural network based natural language inference model using the first data set and the second data set.

11. The computer-implemented method of claim 10, wherein the life span information comprises a birth date and a death date.

12. The computer-implemented method of claim 1, wherein the method is performed by a fact verification system.

13. The computer-implemented method of claim 1, wherein the method is performed by a news summarization system.

14. A computer program product for teaching syntax for training a neural network based natural language inference model, the computer program product comprising a non-transitory computer readable storage medium having program instructions embodied therewith, the program instructions executable by a computer to cause the computer to perform a method comprising:

selectively performing, by the hardware processor, person reversal on a set of hypothesis sentences comprised in original training data, based on person reversal prevention criteria, to obtain a first training data set;

enhancing, by the hardware processor, a robustness of the neural network based natural language inference model to syntax changes by training the neural network based natural language inference model on the original training data combined with the first training data set, wherein the person reversal reverses named entities referring to people, and wherein the person reversal prevention criteria comprises, for a given hypothesis sentence from the set, the hypothesis sentence including a reciprocal verb.

15. The computer program product of claim 14, wherein the hypothesis sentences are labeled using labels selected from the group consisting of entailment, neutral, and contradiction.

16. The computer program product of claim 15, wherein said selectively performing step changes existing labels of the hypothesis sentences.

17. The computer program product of claim 14, wherein the method further comprises selectively transforming, by a hardware processor, a set of hypothesis sentences to use a passive voice, based on satisfying transformation performing criteria and not satisfying transformation prevention criteria, to obtain a second training data set, and wherein said enhancing step comprises training the training the neural network based natural language inference model using the original training data combined with the first data set and the second data set.

18. A computer processing system for teaching syntax for training a neural network based natural language inference model, comprising:

a memory for storing program code; and
a processor for running the program code to:
   selectively perform person reversal on a set of hypothesis sentences comprised in original training data, based on person reversal prevention criteria, to obtain a first training data set;
   enhance a robustness of the neural network based natural language inference model to syntax changes by training the neural network based natural language inference model on the original training data combined with the first training data set,
wherein the person reversal reverses named entities referring to people, and
wherein the person reversal prevention criteria comprises, for a given hypothesis sentence from the set, the hypothesis sentence including a reciprocal verb.

* * * * *